US012024684B2

(12) United States Patent
Aslaner et al.

(10) Patent No.: US 12,024,684 B2
(45) Date of Patent: Jul. 2, 2024

(54) FURNACE SYSTEMS AND METHODS FOR CRACKING HYDROCARBONS

(71) Applicant: ExxonMobil Chemical Patents Inc., Baytown, TX (US)

(72) Inventors: William A. Aslaner, League City, TX (US); Thomas T. Hirst, Houston, TX (US); David Spicer, Houston, TX (US); George Stephens, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 243 days.

(21) Appl. No.: 17/624,634

(22) PCT Filed: Jul. 22, 2020

(86) PCT No.: PCT/US2020/042987
§ 371 (c)(1),
(2) Date: Jan. 4, 2022

(87) PCT Pub. No.: WO2021/016301
PCT Pub. Date: Jan. 28, 2021

(65) Prior Publication Data
US 2022/0259504 A1    Aug. 18, 2022

Related U.S. Application Data

(60) Provisional application No. 62/878,038, filed on Jul. 24, 2019.

(30) Foreign Application Priority Data

Oct. 31, 2019  (EP) .................................... 19206404

(51) Int. Cl.
*C10G 9/16*        (2006.01)
*B01D 45/16*    (2006.01)
(Continued)

(52) U.S. Cl.
CPC ............... *C10G 9/16* (2013.01); *B01D 45/16* (2013.01); *B04C 5/185* (2013.01); *C10G 9/20* (2013.01); *C10G 9/36* (2013.01); *C10G 2400/20* (2013.01)

(58) Field of Classification Search
CPC ... C10G 9/16; C10G 9/20; C10G 9/36; C10G 2400/20; B01D 45/16; B04C 5/185
See application file for complete search history.

(56) References Cited

U.S. PATENT DOCUMENTS 5,183,642 A    2/1993 Lenglet
8,002,951 B2   8/2011 Spicer et al.
(Continued)

FOREIGN PATENT DOCUMENTS

WO    2010/027541 A1    3/2010
WO    2021/016291 A1    1/2021
WO    2021/016301 A1    1/2021

OTHER PUBLICATIONS

"Assessment of Work Practice Standards for Ethylene Cracking Furnace Decoking Operations Located in the Ethylene Production Source Category." (submitted to the EPA Office of Air Quality Planning and Standards on Jun. 2019). (Year: 2019).*

(Continued)

*Primary Examiner* — Ali Z Fadhel

(57) ABSTRACT

Furnace systems and methods for steam cracking hydrocarbons to produce ethylene and other light olefins are provided herein. A furnace system for cracking hydrocarbons includes a radiant firebox containing a plurality of burners and an injection nozzle, a primary transfer line exchanger fluidly coupled to and downstream of the radiant firebox, and a flow restrictor fluidly coupled to and downstream of the primary transfer line exchanger. The furnace system also includes a decoke vessel containing an effluent inlet, a fluid outlet, and a coke outlet, where the effluent inlet is fluidly coupled to (Continued)

and downstream of the flow restrictor and the fluid outlet is fluidly coupled to and upstream of the injection nozzle of the radiant firebox, and a coke collection bin is coupled to the coke outlet of the decoke vessel.

25 Claims, 2 Drawing Sheets

(51) Int. Cl.
*B04C 5/185* (2006.01)
*C10G 9/20* (2006.01)
*C10G 9/36* (2006.01)

(56) References Cited

U.S. PATENT DOCUMENTS

| | | |
|---|---|---|
| 8,647,415 B1 | 2/2014 | De Haan et al. |
| 9,630,188 B2 | 4/2017 | Evans et al. |
| 2013/0239999 A1 | 9/2013 | Bhirud |
| 2014/0024873 A1 | 1/2014 | De Haan et al. |
| 2016/0024387 A1* | 1/2016 | Evans .............. C10G 9/16 95/271 |

OTHER PUBLICATIONS

Federal Register vol. 65, No. 235 Wednesday Dec. 6, 2000, Environmental Protection Agency 40 CFR Part 63, National Emission Standards for hazardous Air Pollutants: Generic Maximum Achievable Control Technology: Proposed Rule, p. 76432, center column, (h), Decoking, 50 pages.

Heinz, Z. et al., (2012) "Ethylene", In: Ullmann's Encyclopedia of Industrial Chemistry, vol. 13, 66 Pages.

Perry's Chemical Engineering Handbook Robert H. Perry, Don W. Green, Sixth Edition 1984 Dust Collection Equipment, pp. 20-85, 20-88, 2 pages.

US EPA Archives, Permit Application: Additional Furnace Project, CN: 602817884, RN: 100238708, Project No. 412-15, Feb. 2012, Section 2.1.1 Decoking, 108 pages.

Air Quality Plan Approval Application, Petrochemical Complex, Shell Chemical Appalachia LLC, Beaver County, Pennsylvania, May 2014, Section 3.1.2 Ethylene Manufacturing Emission Sources, 3.1.2.1 Ethane Cracking Furnaces, Decoking, 4 pages.

* cited by examiner

FURNACE SYSTEMS AND METHODS FOR CRACKING HYDROCARBONS

CROSS-REFERENCE TO RELATED APPLICATIONS

This application is a US national phase application of PCT Application Serial No. PCT/US2020/042987 having a filing date of Jul. 22, 2020, which claims priority to and the benefit of U.S. Provisional Application No. 62/878,038, filed Jul. 24, 2019, and European Patent Application No. 19206404.6 which was filed Oct. 31, 2019, the disclosures of which are incorporated herein by reference in their entireties.

FIELD

The present disclosure is generally related to furnace systems and methods for cracking hydrocarbons, more specifically related to steam cracking furnace systems and methods for decoking while steam cracking to produce ethylene.

BACKGROUND

Ethylene remains the foundation of the modern petrochemical industry. The overwhelming majority of ethylene produced commercially is manufactured by steam cracking. In steam cracking, a hydrocarbon feed is supplied to the convection section of a cracking furnace, preheated and mixed with dilution steam, and further preheated to a temperature at which thermal cracking is about to occur, or is occurring to a slight extent.

The mixed feed and dilution steam, also known as the production effluent, is then passed to the radiant section of the furnace where cracking to ethylene and other byproducts occurs. Selectivity to ethylene is favored by radiant sections with short residence times and low pressure drop. The feed and dilution steam mixture is rapidly heated to produce an economically attractive array of products. The temperature to which the mixture is heated again tends to increase as the feed becomes lighter. The product yield array includes byproducts as light as hydrogen and as heavy as tar, in addition to the desired light olefins (e.g., ethylene, propylene, butenes, or butadiene).

The heat input required by the furnace is provided by burners generally mounted in the floor and/or walls of the radiant section. The fuel for these burners may be a hydrogen/methane mix recovered from the byproducts of the cracking reaction, or may be an external fuel supply, or a mixture of both.

Thereafter, the cracked effluent passes from the radiant (reaction) section of the furnace to a quench exchanger that rapidly cools the effluent and prevents further reaction occurring. Modern quench exchangers generate very high pressure steam typically at about 1,500 psig pressure or greater. The very high pressure steam is superheated in the convection section of the furnace to temperatures typically in the range of about 900° F. to about 1,000° F. before being used the drive large steam turbines in the recovery section of the ethylene plant.

The effluent is then sent to the recovery section of the plant for separation into the various desired products and by-products. The manufacture of ethylene requires significant energy input, and modern furnaces include many features to improve their energy efficiency. Whenever possible, the convection section includes a boiler feed water (BFW) economizer or preheat coil to recover additional energy from the hot flue-gas and increase the high pressure steam production rate from the furnace.

An undesirable byproduct of the cracking process is the deposition of coke on the interior surfaces of the radiant tubes. The coke acts as a hydraulic restriction to the flow of feed and dilution steam through the coil. Coke also imposes a thermal resistance to the passage of heat through the walls of the tube to the feed/dilution steam mixture, thus increasing the tube metal temperature. When either the radiant coil pressure drop or the radiant coil tube metal temperature reach a critical value (which depends on the design of the individual furnace), the furnace must be taken out of production to have the coke removed ("decoked").

Decoking is generally achieved by removing the feed from the furnace (and reducing the energy input from the burners), moving the steam effluent away from the ethylene plant recovery system to a decoke system, and progressively adding air to the steam. The air/steam mixture burns the coke from the inside of the radiant coil, although as the coke structure burns, significant quantities of solid coke are liberated (spalled) and are carried into the decoke system in the air/steam mixture. When the decoking is complete, the air is withdrawn from the furnace, and with only steam in the coils, the effluent is swung back to the plant recovery section. Feed is reintroduced to the furnace and another cracking (production) cycle commences.

The effluent stream leaving the furnace during decoking contains air and steam, but also particles of various sizes (e.g., coke, coke precursors, and other particulate compositions), carbon monoxide, and carbon dioxide. Methods have been proposed for removing particulates from the decking effluent, e.g., in U.S. Pat. Nos. 8,647,415 and 9,630,188, in which the solids are removed at a relatively high pressure. These conventional methods utilize sequence of valves, pressurized lock hoppers, dead legs, and the like to store the removed solids at a relatively high pressure until decoking is finished and the isolated particulates can be emptied (e.g., from the dead leg or lock hopper) taken away from the process.

Although progress has been made, there remains a need for improved furnace systems and methods for cracking hydrocarbons and methods for decoking the furnace systems. There is especially a need for improved decking methods which can remove and isolate particulates from the decoking effluent at a lesser pressure than is used in conventional methods, e.g., for decreased equipment costs and greater process efficiency.

SUMMARY

Embodiments of the present disclosure provide furnace systems and methods for steam cracking hydrocarbons to produce light olefins, such as ethylene, which provide high thermal efficiencies over prior systems and methods. Embodiments also include methods for decoking the furnace systems. In one or more embodiments, a furnace system for cracking hydrocarbons includes a radiant firebox containing a plurality of burners and a plurality of injection nozzles (e.g., decoke effluent injection nozzles), a primary transfer line exchanger fluidly coupled to and downstream of the radiant firebox, and a flow restrictor fluidly coupled to and downstream of the primary transfer line exchanger. The furnace system also includes a decoke vessel containing an effluent inlet, a fluid outlet, and a coke outlet, where the effluent inlet is fluidly coupled to and downstream of the flow restrictor and the fluid outlet is fluidly coupled to and upstream of the injection nozzle of the radiant firebox, and a coke collection bin is coupled to the coke outlet of the decoke vessel.

In one or more embodiments, a furnace system for cracking hydrocarbons includes a radiant firebox containing a plurality of burners and an injection nozzle, a primary transfer line exchanger fluidly coupled to and downstream of the radiant firebox, and a secondary transfer line exchanger fluidly coupled to and downstream of the primary transfer line exchanger. The furnace system also includes a first valve disposed between the primary transfer line exchanger and the secondary transfer line exchanger, a decoke effluent line fluidly coupled to and downstream of the primary transfer line exchanger and fluidly coupled to and upstream of the first valve, and a second valve fluidly coupled to the decoke effluent line downstream of the primary transfer line exchanger. The furnace system further includes a flow restrictor fluidly coupled to the decoke effluent line downstream of the second valve, a decoke vessel fluidly coupled to the decoke effluent line and containing an effluent inlet, a fluid outlet, and a coke outlet, wherein the effluent inlet is fluidly coupled to and downstream of the flow restrictor and the fluid outlet is fluidly coupled to and upstream of the injection nozzle of the radiant firebox, and a coke collection bin is coupled to the coke outlet of the decoke vessel.

In some embodiments, a furnace system for cracking hydrocarbons includes a radiant firebox containing a plurality of burners, an injection nozzle, and one or more coils, where the coils are or include radiant coils, convection coils, or any combination thereof, a primary transfer line exchanger fluidly coupled to and downstream of the radiant firebox, and a secondary transfer line exchanger fluidly coupled to and downstream of the primary transfer line exchanger. The furnace system also includes a first valve disposed between the primary transfer line exchanger and the secondary transfer line exchanger, a decoke effluent line fluidly coupled to and downstream of the primary transfer line exchanger and fluidly coupled to and upstream of the first valve, a second valve fluidly coupled to the decoke effluent line downstream of the primary transfer line exchanger, and a flow restrictor fluidly coupled to the decoke effluent line downstream of the second valve. The furnace system further includes a decoke vessel fluidly coupled to the decoke effluent line and containing an effluent inlet, a fluid outlet, and a coke outlet, where the effluent inlet is fluidly coupled to and downstream of the flow restrictor and the fluid outlet is fluidly coupled to and upstream of the injection nozzle of the radiant firebox. The decoke vessel is or contains a cyclone separator and is configured to receive decoke effluent via the effluent inlet, separate the decoke effluent into coke particles and a decoke fluid, and transfer the coke particles to the coke collection bin via the coke outlet and the decoke fluid to the injection nozzle via the fluid outlet. The furnace system further includes a coke collection bin coupled to the coke outlet of the decoke vessel, where the coke collection bin is configured to store the coke particles at ambient pressure.

In one or more embodiments, a method of cracking hydrocarbons includes flowing a decoke effluent from a radiant firebox through a primary transfer line exchanger, flowing the decoke effluent from the primary transfer line exchanger through a flow restrictor, and flowing the decoke effluent from the flow restrictor to a decoke vessel. The method also includes separating the decoke effluent into coke particles and a decoke fluid within the decoke vessel, transferring the coke particles from the decoke vessel to a coke collection bin, transferring the decoke fluid from the decoke vessel to the radiant firebox, and combusting the decoke fluid within the radiant firebox.

BRIEF DESCRIPTION OF THE DRAWINGS

So that the manner in which the above recited features of the disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of scope, for the disclosure may admit to other equally effective implementations.

Figure 1:
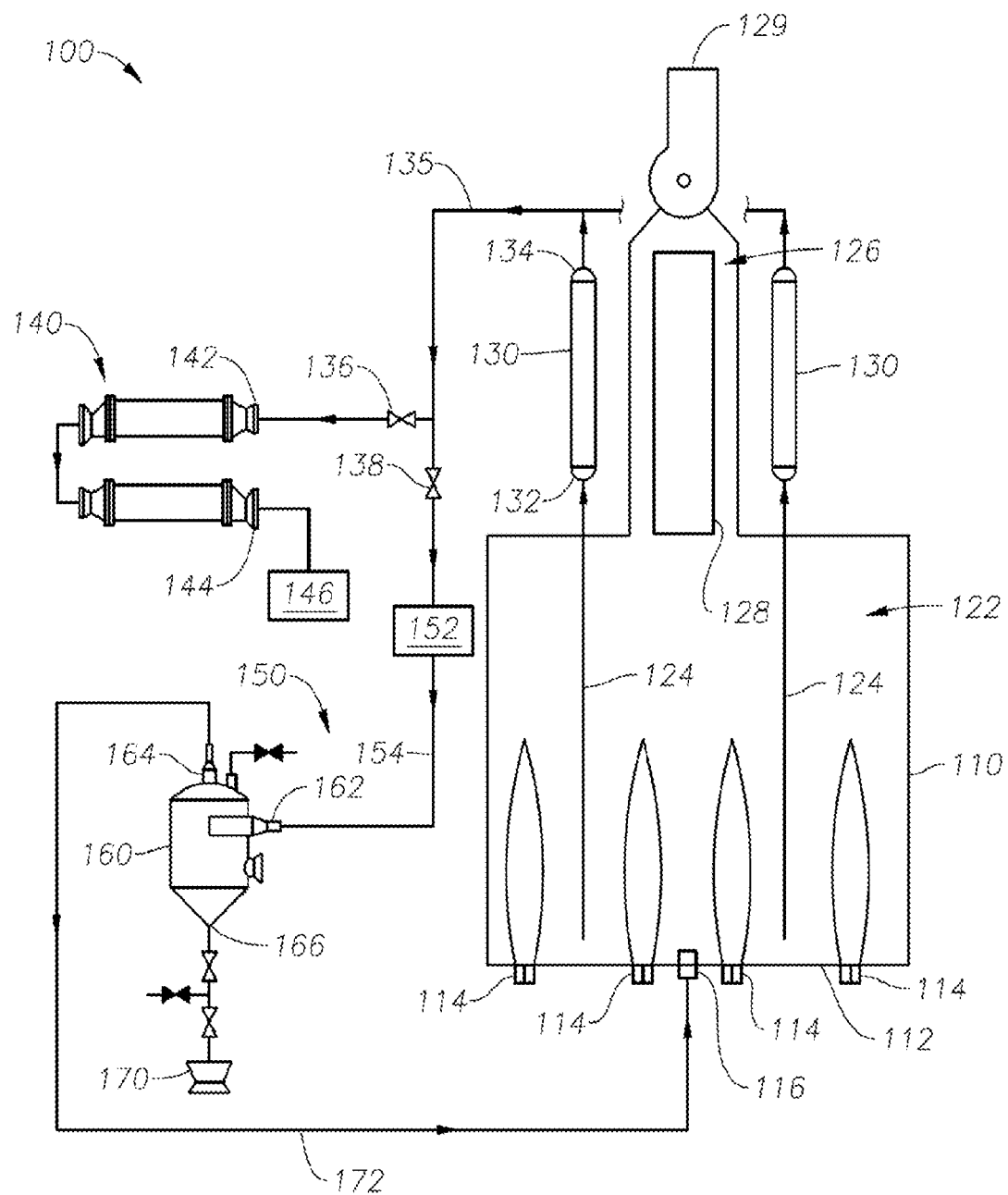
FIG. 1 is a schematic diagram of a furnace system for cracking hydrocarbons, as described and discussed in one or more embodiments herein.

To facilitate understanding, identical reference numerals have been used, where possible, to designate identical elements that are common to the Figures. It is contemplated that elements and features of one implementation may be beneficially incorporated in other implementations without further recitation.

DETAILED DESCRIPTION

Embodiments of the present disclosure provide furnace systems and methods for cracking hydrocarbons, including methods for steam cracking hydrocarbons to produce light olefins (e.g., ethylene, propylene, butenes, or butadiene). Methods also provide maintenance of the furnace systems during cracking operations and during periodic decoking of the furnace systems.

Overall, fouling of heat exchangers and other process equipment and components are a common problem within the petrochemical industry. Upsets or intentional changes in cracking conditions during normal operation can result in cooling and contraction of radiant section tubes, breaking off of coke or spalling, and flow of the coke or spalling downstream, e.g., in a transfer line exchanger and/or other downstream equipment.

Embodiments disclosed herein relate to a process for increasing thermal and economic efficiencies of the overall system and reducing fouling in heat exchangers during continuous or semi-continuous processes. Additionally, embodiments disclosed herein may be useful for preventing fouling in other process equipment, such as pumps, valves, compressors, and other common equipment where unwanted buildup of foulants is undesirable or where the presence of solid components is unwanted. Additionally, minimizing the amount of large coke particles that enter the firebox in the case of firebox decoking help to facilitate the complete burning of coke and reduce the heater stack emissions (e.g., PM10 (sub-10 μm particulate matter) and PM 2.5 (sub-2.5 μm particulate matter)). In some embodiments, the foulant collection device may be isolated and emptied without discontinuing one or more portions of the continuous or semi-continuous process. In this manner, the foulant fraction does not get transported to the second heat exchange device. Additionally, the accumulated foulant may be emptied from the collection device on a periodic basis without the need to shut down critical process operations (e.g., decoking process), providing for continuity of operations or improved process aspects, such as reduced stresses, ease of restart, increased production, and other benefits as may be highlighted from the following embodiments related to hydrocarbon cracking processes.

FIG. 1 is a schematic diagram of a furnace system 100 for cracking hydrocarbons to ethylene and other olefins and reducing fouling during production of such olefins, as described and discussed in one or more embodiments herein. The furnace system 100 includes a radiant firebox 110 containing a plurality of burners 114 (four burners 114 are shown in FIG. 1) and one or more injection nozzles 116 (one injection nozzle 116 is shown in FIG. 1) located on a surface 112 (e.g., a bottom surface) of the radiant firebox 110. Although not shown, one or more burners 114 and/or one or more injection nozzles 116 can be located at other surfaces of the radiant firebox 110, such as a surface (e.g., sidewalls) perpendicular to surface 112 or a surface (e.g., top surface) opposite surface 112. In one or more embodiments, at least a portion of the plurality of burners 114 is located on surface 112 of the radiant firebox 110 and the injection nozzle 116 is located adjacent to at least a portion of the plurality of burners 114.

Although FIG. 1 depicts the radiant firebox 110 containing four of the burners 114 and one injection nozzle 116, the radiant firebox 110 can have a range of the burners 114 and the injection nozzles 116. In one or more embodiments, the radiant firebox 110 can have from 1, 2, 3, 4, 5, 6, 8, 10, about 12, about 15, about 18, or about 20 to about 22, about 24, about 30, about 35, about 40, about 45, about 48, about 50, about 55, about 60, about 64, about 68, about 70, about 80, or about 100 of the burners 114 and/or the injection nozzles 116, independently. For example, the radiant firebox 110 can have from 1 to about 100, from 1 to about 64, from 1 to about 50, from 1 to about 48, 1 to about 40, 1 to about 35, 1 to about 30, 1 to about 25, from 1 to about 24, 1 to about 20, 1 to about 15, 1 to about 10, 1 to about 5, 1 to about 3, about 10 to about 100, about 10 to about 64, about 10 to about 50, about 10 to about 48, about 10 to about 40, about 10 to about 35, about 10 to about 30, about 10 to about 25, about 10 to about 24, about 10 to about 20, about 10 to about 15, about 10 to about 12, about 20 to about 100, about 20 to about 64, about 20 to about 50, about 20 to about 48, about 20 to about 40, about 20 to about 35, about 20 to about 30, about 20 to about 25, about 20 to about 24, about 20 to about 22, about 24 to about 100, about 24 to about 64, about 24 to about 48, about 48 to about 100, about 48 to about 64, or about 64 to about 100 of the burners 114 and/or the injection nozzles 116, independently. In one or more examples, the radiant firebox 110 can have about 24, about 48, or about 64 of the burners 114 and about 24 of the injection nozzles 116.

In one or more embodiments, each of the burners 114 can independently be any type of burner. In some embodiments, the burners 114 do not recirculate the flue-gas back into the combustions zone, such as the radiant section 122, within the radiant firebox 110. In one or more examples, the burners 114 can be any of the burners described in U.S. Pat. No. 8,002,951, which is herein incorporated by reference. In some examples, the burners 114 can be the burner shown in FIG. 4 of U.S. Pat. No. 8,002,951, but configured to not recirculate the flue-gas from the furnace to the primary air chamber.

The radiant firebox 110 contains a radiant section 122 and a convection section 126. The radiant section 122 includes one, two, or more radiant coils 124 extending upwards from the surface 112 and the convection section 126 contains one, two, or more convection coils 128, or any combination thereof. The radiant firebox 110 can include any combination and number of the radiant coils 124 and/or the convection coils 128. The furnace system 100 includes one, two, or more feed lines (not shown) fluidly coupled to the radiant coils 124. The feed lines can be or include one or more hydrocarbon feed lines, one or more steam feed lines, one or more additive feedlines, or any combination thereof. For example, a hydrocarbon feed line is used to transfer a production effluent (also known as a mixed feed and dilution steam) containing the hydrocarbons to the radiant coils 124. The production effluent contains butane, propane, ethane, asphaltenes, resid, pitch, gas oil, naphtha, one or more other hydrocarbons, or any combination thereof. The hydrocarbons are cracked to produce product gases, such as ethylene, propylene, and/or other olefins upon the application of heat. Other hydrocarbons, such as C5, C6 hydrocarbons, gas oil, naphtha, and heavier/longer hydrocarbons may also be used to produce olefins according to any embodiment.

The furnace system 100 includes a primary transfer line exchanger (PTLE) 130 or other quench exchanger fluidly coupled to and downstream of the radiant firebox 110, and a secondary transfer line exchanger (STLE) 140 or another quench exchanger fluidly coupled to and downstream of the PTLE 130 via a transfer line 135. More specifically, the PTLE 130 has an inlet 132 and an outlet 134 and the STLE 140 has an inlet 142 and an outlet 144. The furnace system 100 also includes a first valve 136 (e.g., transfer line valve) disposed on the transfer line 135 between the PTLE 130 and the STLE 140, such as between the outlet 134 of the PTLE 130 and the inlet 142 of the STLE 140. Therefore, the inlet 142 of the STLE 140 is fluidly coupled to the outlet 134 of the PTLE 130 and the outlet 144 of the STLE 140 is fluidly coupled to one or more recovery systems 146.

In one or more examples, each of the PTLE 130 and the STLE 140 can independently be a quench exchanger that rapidly cools the effluent and prevents further reaction of the effluent from occurring. The first valve 136 can be or include a motor operated valve (MOV), an electronic valve, a mechanical valve, a pneumatic valve, a hydraulic valve, or a manual valve. The first valve 136 can also be a multi-valve, such as a three-way valve.

In operation of furnace system 100, the production effluent containing the hydrocarbon feed is first preheated, and in the case of liquid feeds commonly at least partially vaporized, and mixed with dilution steam in the convection section 126 of the furnace system 100. The temperature of the production effluent exiting the convection section 126 is generally designed to be at or near the point where significant thermal cracking commences. Typically, for example, the temperature of the convection section 126 is about 1,050° F. (565° C.) to about 1,150° F. (620° C.) for gas-oil feeds, about 1,150° F. (620° C.) to about 1,250° F. (675° C.) for naphtha feeds, and/or about 1,250° F. (675° C.) to about 1,350° F. (730° C.) for ethane feed. After preheating in convection section 126, a vapor feed/dilution steam mixture is typically rapidly heated in the radiant section 122 to achieve the desired level of thermal cracking. The coil outlet temperature (COT) of radiant section 122 is typically about 1,450° F. (790° C.) to about 1,500° F. (815° C.) for gas oil feeds, about 1,500° F. (815° C.) to about 1,600° F. (870° C.) for naphtha feeds, and/or about 1,550° F. (845° C.) to about 1,650° F. (900° C.) for ethane feeds. After the desired degree of thermal cracking has been achieved in radiant section 122, the furnace effluent is rapidly quenched in the PTLE 130.

During the production process that includes cracking reactions, carbonaceous foulants such as coke, carbon, and/or tars may be produced as a by-product. Steam may be fed or otherwise introduced as a diluent, such as via a flow line fluidly coupled to the radiant coils 124. Heat is supplied by a heating medium introduced to the exterior of the radiant coils 124 in the radiant section 122 of the radiant firebox 110 through heating medium inlets or burners 114 (e.g., hearth burners, floor burners, or wall burners). Subsequently, heat passes through the convection section 126 containing the convection coils 128, and then out through an exhaust 129.

After the production effluent containing the hydrocarbon feed is processed through the radiant section 122 and the convection section 126, the products (e.g., gases) flow through the PTLE 130 and the STLE 140. The production effluent containing product exits the outlet 144 of the STLE 140 and is directed to one or more recovery systems 146. The recovery system 146 can be or include a recovery section of the plant, a storage vessel or container, one or more types of downstream processing equipment (e.g., a quench tower and/or separation device), or any combination thereof.

The furnace system 100 includes a decoking system 150, which is a bypass system that is brought on-line or otherwise activated to perform a decoking process. The decoking system 150 includes a decoke effluent line 154 and a second valve 138 (e.g., a decoke effluent line valve) which work in conjunction with the first valve 136 to toggle between production mode and decoking mode. The decoke effluent line 154 is fluidly coupled to and downstream of the PTLE 130 and fluidly coupled to and upstream of the first valve 136. The second valve 138 is fluidly coupled to the decoke effluent line 154 downstream of the PTLE 130. The second valve 138 can be or include a motor operated valve (MOV), an electronic valve, a mechanical valve, a pneumatic valve, or a manual valve. The second valve 138 can also be a multi-valve, such as a three-way valve that performs the functions of both of valves 136 and 138. In other words, the first valve 136 and the second valve 138 can be replaced by a single, three-way valve (not shown) fluidly coupled to and in between the transfer line 135 and the flow restrictor 152. In other aspects, valves 136 and 138 are coupled, and operated under common control, e.g., under common mechanical, electrical, or electro-mechanical control. In these aspects a control system controlling valves 136 and 138 may be configured to prevent valve 136 from opening while valve 138 is opened, and vice versa. The control system can be an automated control system, but this is not required. For example, manual control is within the scope of the invention.

The decoking system 150 of the furnace system 100 further includes a flow restrictor 152 having one or more flow restriction orifices fluidly coupled to the decoke effluent line 154 downstream of the second valve 138, a decoke vessel 160 fluidly coupled to the decoke effluent line 154, and a coke collection bin 170 is coupled to the decoke vessel 160. The second valve 138 is disposed between the PTLE 130 and the flow restrictor 152. The STLE 140 is fluidly coupled to and downstream of the PTLE 130 as well as fluidly coupled to and upstream of the second valve 138 and the flow restrictor 152.

Certain embodiments include at least one PTLE and at least on STLE. For example, the PTLE can be utilized for producing steam, and the STLE can be utilized preheating hydrocarbon feed to the steam cracking furnace's convection section. It has surprisingly been discovered a feed preheat secondary TLE the authors found that drawing decoke effluent from outlet 144 resulted in an increase in fuel consumption (i.e., less energy efficiency) during decoking mode than when the decoke effluent is removed via line 154. The increased fuel consumption during decoking mode is needed to maintain the radiant firebox at the desired decoking temperature. This effect is surprising since the prior art generally indicates that energy recovery (e.g., in an STLE for feed preheating) results in an increase energy efficiency, which would lessen the amount of fuel needed.

As an illustrative example of a typical cracking furnace operating in decoking mode, removing the decoke effluent stream via line 154 results in a decoke effluent stream having a greater temperature (361° C.) than when the decoke effluent stream is removed via outlet 144 (266° C.). The lesser temperature of the decoke stream if removed via outlet 144 leads to a firebox temperature that is less than the desired range of 980° C. to 1040° C. (flue-gas temperature), and additional burner fuel is thus needed to achieve the desired firebox temperature. Those skilled in the art will also appreciate that STLE decoking generally is not required, as typically it does not foul during operation. As a result, there is no appreciable furnace performance penalty when decoke effluent is not passed through the STLE.

In one or more embodiments, the first valve 136 and the second valve 138 can be simultaneously opened and/or closed relatively to each other. For example, the first valve 136 can be opened while and the second valve 138 is closed. Alternatively, the first valve 136 can be closed while and the second valve 138 is opened. In some embodiments, the first valve 136 and the second valve 138 can be two valves in series with each other. In other embodiments, a single valve, such as a three-way valve (not shown), can be used instead of the first valve 136 and the second valve 138. If used, the three-way valve is fluidly coupled to and disposed between the PTLE 130, the STLE 140, and the flow restrictor 152. For example, the three-way valve is fluidly coupled to and downstream of the outlet 134 via the transfer line 135, fluidly coupled to and upstream of the inlet 142 of the STLE 140, and fluidly coupled to and upstream of the flow restrictor 152.

The flow restrictor 152 increases pressure upstream of the flow restrictor 152 and the decoke vessel 160, such that the decoke vessel 160 can be operated at less pressure, such as at or about ambient pressure. Ambient pressure, as used herein, is a pressure of about 740 Torr to about 780 Torr, about 750 Torr to about 770 Torr, about 755 Torr to about 765 Torr, or about 760 Torr. Operating the decoke vessel 160 at or about ambient pressure decreases costs and improved process efficiency. For example, decoke vessel 160 and coke collection bin 170 can be made of thinner construction than is needed for conventional decoke vessels and coke collection bins-which operate at a greater pressure.

Flow restrictor 152 can be or include one or more restriction orifice plates, baffles, pipe or conduit with a narrowed diameter, or any combination thereof. In one or more examples, the flow restrictor 152 includes one, two, three, four, or more restriction orifice plates. The restriction orifice plates can be placed in series if two or more restriction orifice plates are used together. The restriction orifice plate can have one or multiple holes or orifices passing therethrough which provide fluid communication between the transfer line 135 and the decoke effluent line 154. Positioning flow restrictor 152 upstream of the decoke vessel 160 and the decoke to firebox line 172 provides a surprising process benefits over conventional processes. Positioning a flow restrictor immediately upstream of the injection nozzles 116, e.g., in line 172, can lead to an uneven flow distribution when more than one injection nozzle is used. Moreover, it has been observed that configuring the decoke to firebox line 172 to provide a desired pressure drop to each nozzle can in turn result in an unequal flow to each injection nozzle 116.

The unequal flow distribution in the firebox can in turn result in burner flame instability, potentially leading to unsafe operation. These difficulties are largely avoided or decreased by positioning flow restrictor 152 upstream of the decoke vessel 160.

In some embodiments, the restriction orifice plate has 2, 3, 4, 5, 6, 7, 8, 9, 10, 11, or 12 holes to 13, 14, 15, about 18, about 20, about 24, about 28, about 30, about 32, about 35, about 40 holes, or about 50 holes. For example, the restriction orifice plate has from 2 to about 50 holes, 2 to about 40 holes, 2 to about 30 holes, 2 to about 25 holes, 2 to about 20 holes, 2 to about 18 holes, 2 to about 15 holes, 2 to about 13 holes, 2 to about 10 holes, 2 to about 8 holes, 2 to about 5 holes, about 5 to about 50 holes, about 5 to about 40 holes, about 5 to about 30 holes, about 5 to about 25 holes, about 5 to about 20 holes, about 5 to about 18 holes, about 5 to about 15 holes, about 5 to about 13 holes, about 5 to about 10 holes, about 5 to about 8 holes, about 10 to about 100 holes, about 10 to about 40 holes, about 10 to about 30 holes, about 10 to about 25 holes, about 10 to about 20 holes, about 10 to about 18 holes, about 10 to about 15 holes, about 10 to about 14 holes, about 10 to about 13 holes, or about 10 to about 12 holes. In some examples, the flow restrictor 152 includes two or more restriction orifice plates positioned in series and each orifice plate has a plurality of holes, such as about 4, about 8 about 10, or about 12 holes to about 14, about 16, about 20, or about 24 holes.

The decoke vessel 160 includes an effluent inlet 162, a fluid outlet 164, and a coke outlet 166. The effluent inlet 162 is fluidly coupled to and downstream of the flow restrictor 152 and the fluid outlet 164 is fluidly coupled to and upstream of the injection nozzles 116 of the radiant firebox 110. The coke collection bin 170 is coupled to the coke outlet 166 of the decoke vessel 160.

In one or more embodiments, the decoke vessel 160 is or includes a decoking drum or a cyclone separator. The cyclone separator or other decoke vessel 160 receives decoke effluent from the decoke effluent line 154 via the effluent inlet 162, separates the decoke effluent into coke particles and a decoke fluid, and transfers the coke particles to the coke collection bin 170 via the coke outlet 166. The decoke fluid in the decoke vessel 160 is transferred or sent from the fluid outlet 164, through a decoke to firebox line 172 to the injection nozzles 116.

In one or more embodiments, the coke collection bin 170 is located in the plant such that the accumulated coke/foulant can periodically be emptied and carted away for disposal. The coke collection bin 170 can be or include one or more bins, vessels, hoppers, coke catchers, or other structures into which the accumulated foulant is emptied, may be movable, such as via wheels or forklift, and may be continuously located proximate the decoke vessel 160, or may be temporarily placed for emptying when desired or necessary. In some examples, the coke collection bin 170 is a dust or coke collection bin which can be sealed to keep in all of the collected particles, but keeps an ambient pressure. The coke collection bin 170 stores or otherwise contains the coke particles at ambient pressure. The coke collection bin 170 can include a cut-out system to prohibit pressurization above ambient pressure or any other predetermined pressure. This can be accomplished, e.g., by utilizing a furnace cut-out system, such as one that automatically decreases burner duty in response to over-pressurization of radiant section 122. In one or more examples, ambient pressure, as used herein, is a pressure of about 740 Torr to about 780 Torr, about 750 Torr to about 770 Torr, about 755 Torr to about 765 Torr, or about 760 Torr.

The placement of the flow restrictor 152 immediately upstream of the decoke vessel 160 provides the decoke vessel 160 and the coke collection bin 170 to operate at relative low pressure, such as at or near ambient pressure, and therefore does not require the coke collection bin 170 to be a pressurized "lock-hopper"—as is the case if the flow restrictors were in the risers or in other locations within the system. The STLE 140 and the second valve 138 disposed upstream of the decoke vessel 160 provide the furnace system 100 with high thermal efficiencies over prior systems.

The decoke vessel 160 and/or the coke collection bin 170 according to one or more embodiments disclosed herein may also include one or more valves, bulkheads, handholes, or other functional connections. For example, a valve may be provided as a steam supply inlet for purging any lighter hydrocarbons from the accumulated coke/foulant prior to discharge. In other examples, a valve may be provided as a cooling water inlet to quench the accumulated foulant and provide a liquid environment to prevent exposure of potentially pyrophoric material to air. Other inlets and outlets may also be provided for nitrogen purge or sweep, cleaning, or other purposes. If desired or beneficial, one or more of the connections may be attached to the decoke vessel 160 and/or the coke collection bin 170 using an angled connection to prevent buildup of foulant.

During cracking operations in the production process, coke and carbon may form on to the radiant coils 124, the PTLE 130, the transfer line 135, and other equipment or portion of the furnace system 100. The valve 136 is in an opened position and the valve 138 is in a closed position during the production process. In order to interrupt the production process and start the decoking process, the valve 136 is adjusted to a closed position and the valve 138 is adjusted to an opened position. After interruption of the hydrocarbon feed flow, a decoke fluid which can include steam and/or air is injected to remove the coke buildup from at least the radiant coils 124, the PTLE 130, and the transfer line 135. Once the decoking process is complete, the valve 138 is adjusted to a closed position and the valve 136 is adjusted to an opened position, and thereafter, the production process is continued. The production and decoking processes can be sequentially repeated to improve the overall efficiencies of the respective processes while cracking hydrocarbons to produce ethylene and/or other light olefins (e.g., propylene, butenes, or butadiene).

In one or more embodiments, a method of cracking hydrocarbons includes flowing a decoke effluent from the radiant firebox 110 through the PTLE 130, flowing the decoke effluent from the PTLE 130 through a flow restrictor 152, and flowing the decoke effluent from the flow restrictor 152 to a decoke vessel 160. The method also includes separating the decoke effluent into coke particles and a decoke fluid within the decoke vessel 160, transferring the coke particles from the decoke vessel 160 to the coke collection bin 170, transferring the decoke fluid from the decoke vessel 160 to the radiant firebox 110, and combusting the decoke fluid within the radiant firebox 110. In some examples, the decoke fluid contains a portion of the coke particles not separated by the decoke vessel 160. The method includes transferring the coke particles to the coke collection bin 170 at ambient pressure. The method may include storing the coke particles in the coke collection bin 170 at ambient pressure.

In some embodiments, the method includes closing valve 138 disposed between the PTLE 130 and the flow restrictor 152, and flowing a production effluent from the PTLE 130 to the STLE 140. The method includes flowing the production effluent from the STLE 140 to a recovery system 146. In other embodiments, prior to flowing the decoke effluent from the PTLE 130 through the flow restrictor 152, the method further includes flowing a production effluent from the PTLE 130 to the STLE 140, closing the first valve 136 disposed between the PTLE 130 and the STLE 140, opening the second valve 138 disposed between the PTLE 130 and the flow restrictor 152, and flowing the decoke effluent from the PTLE 130 through the flow restrictor 152.

Figure 2:
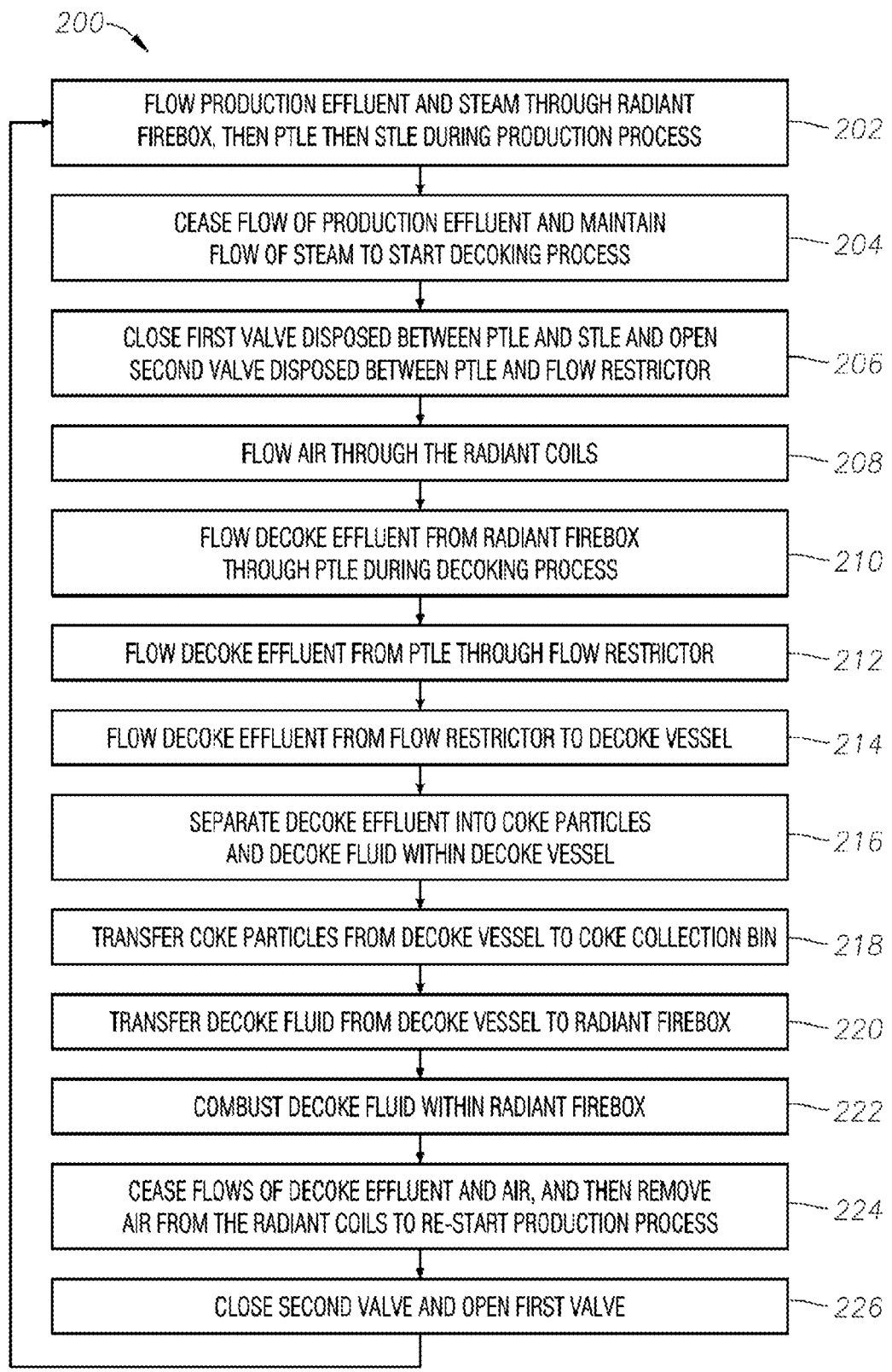
FIG. 2 is a flow chart depicting a method for cracking hydrocarbons, as described and discussed in one or more embodiments herein.

FIG. 2 is a flow chart depicting a method 200 used to crack hydrocarbons with a furnace system to produce ethylene and/or other light olefins during a production process and also decoking the furnace system during a decoking process, as described and discussed in one or more embodiments herein. The method 200 can be performed on the furnace system 100, as well as other different furnace systems not described or discussed herein. The method 200 includes:

At 202, the production effluent and steam are flowed or otherwise passed through the radiant firebox 110 including one, two, or more radiant coils 124 within the radiant section 122, thereafter, the production effluent is flowed through the PTLE 130 and then flowed through the STLE 140 during a production process.

At 204, the flow of production effluent is ceased or otherwise stopped and the flow of steam in maintained when starting a decoking process.

At 206, method 200 includes closing the first valve 136, disposed between the PTLE 130 and the STLE 140, and opening the second valve 138, disposed between the PTLE 130 and the flow restrictor 152. In one or more embodiments, the first valve 136 can be closed simultaneously while the second valve 138 is opened. In some embodiments, the use of a single valve instead of using the first and second valves 136, 138 can provide simultaneous closing and opening. For example, a three-way valve, instead of the first and second valves 136, 138, is used to stop the flow from the PTLE 130 to the STLE 140 while also starting the flow from the PTLE 130 to the flow restrictor 152. In essence, the flow from the PTLE 130 is diverted from the STLE 140 to the flow restrictor 152.

At 208, air is flowed or otherwise passed from the radiant firebox 110 including one, two, or more radiant coils 124 within the radiant section 122 and then flowed or otherwise passed through the PTLE 130 during decoking process.

At 210, the decoke effluent is flowed or otherwise passed from the radiant firebox 110 including one, two, or more radiant coils 124 within the radiant section 122 and then flowed or otherwise passed through the PTLE 130 during decoking process.

At 212, the decoke effluent is flowed or otherwise passed from the PTLE 130 through the flow restrictor 152.

At 214, the decoke effluent is flowed or otherwise passed from the flow restrictor 152 to the decoke vessel 160.

At 216, the decoke effluent is separated into coke particles and decoke fluid within the decoke vessel 160.

At 218, the coke particles are transferred from the decoke vessel 160 to the coke collection bin 170.

At 220, the decoke fluid is transferred from the decoke vessel 160 to the radiant firebox 110. The decoke fluid can be injected or otherwise introduced into the radiant firebox 110 by one or more injection nozzles 116.

At 222, the decoke fluid is combusted within the radiant firebox 110 by the burners 114 disposed within the radiant firebox 110.

At 224, the flows of decoke effluent and the air are ceased or otherwise stopped and the remaining air is purged or otherwise removed from the radiant coils 124 and other portions of the system prior to re-starting production.

At 226, the second valve 138 is closed and the first valve 136 is opened.

In one or more embodiments at 226, the first valve 136 can be opened while simultaneously closing the second valve 138. In some embodiments, if a three-way valve is used at 226, then the stopping and starting of flow can simultaneously occur with the use of the single three-way valve instead of using the first and second valves 136, 138. For example, the three-way valve, instead of the first and second valves 136, 138, is used to stop the flow from the PTLE 130 to the flow restrictor 152 and while stopping the flow from the PTLE 130 to the STLE 140. In essence, the flow from the PTLE 130 is diverted from the flow restrictor 152 to the STLE 140.

Once the second valve 138 is closed and the first valve 136 is opened or the three-way valve is adjusted, the production process starts a new cycle of cracking hydrocarbons to produce light olefins, such as ethylene. The production effluent is flowed or otherwise passed through the radiant firebox 110 and the processes described from 202 to 204 can be repeated. Throughout the method 200, 210 to 226 can occur in part or in full, as well as simultaneously or at least partially or completely overlapping in time during the production and decoking processes described and discussed herein.

In one or more embodiments, the furnace system 100 includes or is incorporated with one or more selective catalytic reduction (SCR) units (not shown). The furnace system 100 and/or methods described and discussed herein including the decoking of the furnace system 100 increase the life expectancy of the SCR system by removing large coke particles in the decoke vessel 160 ahead or upstream of the radiant firebox 110.

Embodiments of the present disclosure further relate to any one or more of the following paragraphs:

1. A furnace system for cracking hydrocarbons, comprising: a radiant firebox comprising a plurality of burners and an injection nozzle; a primary transfer line exchanger fluidly coupled to and downstream of the radiant firebox; a flow restrictor fluidly coupled to and downstream of the primary transfer line exchanger; a decoke vessel comprising an effluent inlet, a fluid outlet, and a coke outlet, wherein the effluent inlet is fluidly coupled to and downstream of the flow restrictor and the fluid outlet is fluidly coupled to and upstream of the injection nozzle of the radiant firebox; and a coke collection bin coupled to the coke outlet of the decoke vessel.

2. The furnace system according to paragraph 1, further comprising a valve disposed between the primary transfer line exchanger and the flow restrictor.

3. The furnace system according to paragraph 1 or 2, further comprising a secondary transfer line exchanger fluidly coupled to and downstream of the primary transfer line exchanger and upstream of the flow restrictor.

4. The furnace system according to paragraph 3, further comprising a valve disposed between the primary transfer line exchanger and the secondary transfer line exchanger.

5. The furnace system according to paragraph 3, wherein the secondary transfer line exchanger comprises an inlet and an outlet, wherein the inlet of the secondary transfer line exchanger is fluidly coupled to the an outlet of the primary transfer line exchanger and the outlet of the secondary transfer line exchanger is fluidly coupled to a recovery system.

6. The furnace system according to any one of paragraphs 1-5, wherein the decoke vessel comprises a cyclone separator.

7. The furnace system according to paragraph 6, wherein the cyclone separator is configured to: receive decoke effluent from via the effluent inlet, separate the decoke effluent into coke particles and a decoke fluid, and transfer the coke particles to the coke collection bin via the coke outlet and the decoke fluid to the injection nozzle via the fluid outlet.

8. The furnace system according to any one of paragraphs 1-7, wherein the coke collection bin is configured to store the coke particles at ambient pressure.

9. The furnace system according to any one of paragraphs 1-8, wherein at least a portion of the plurality of burners is located on a bottom surface of the radiant firebox.

10. The furnace system according to any one of paragraphs 1-9, wherein the injection nozzle is located adjacent to at least a portion of the plurality of burners.

11. The furnace system according to any one of paragraphs 1-10, wherein the radiant firebox further comprises one or more coils disposed therein.

12. The furnace system according to paragraph 11, wherein the coils comprise radiant coils, convection coils, or a combination thereof.

13. A furnace system for cracking hydrocarbons, comprising: a radiant firebox comprising a plurality of burners and an injection nozzle; a primary transfer line exchanger fluidly coupled to and downstream of the radiant firebox; a secondary transfer line exchanger fluidly coupled to and downstream of the primary transfer line exchanger; a first valve disposed between the primary transfer line exchanger and the secondary transfer line exchanger; a decoke effluent line fluidly coupled to and downstream of the primary transfer line exchanger and fluidly coupled to and upstream of the first valve; a second valve fluidly coupled to the decoke effluent line downstream of the primary transfer line exchanger; a flow restrictor fluidly coupled to the decoke effluent line downstream of the second valve; a decoke vessel fluidly coupled to the decoke effluent line and comprising an effluent inlet, a fluid outlet, and a coke outlet, wherein the effluent inlet is fluidly coupled to and downstream of the flow restrictor and the fluid outlet is fluidly coupled to and upstream of the injection nozzle of the radiant firebox; and a coke collection bin coupled to the coke outlet of the decoke vessel.

14. The furnace system according to paragraph 13, wherein the decoke vessel comprises a cyclone separator.

15. The furnace system according to paragraph 14, wherein the cyclone separator is configured to: receive decoke effluent from via the effluent inlet, separate the decoke effluent into coke particles and a decoke fluid, and transfer the coke particles to the coke collection bin via the coke outlet and the decoke fluid to the injection nozzle via the fluid outlet.

16. The furnace system according to any one of paragraphs 13-15, wherein the coke collection bin is configured to store the coke particles at ambient pressure.

17. The furnace system according to any one of paragraphs 13-16, wherein at least a portion of the plurality of burners is located on a bottom surface of the radiant firebox.

18. The furnace system according to any one of paragraphs 13-17, wherein the injection nozzle is located adjacent to at least a portion of the plurality of burners.

19. The furnace system according to any one of paragraphs 13-18, wherein the radiant firebox further comprises one or more coils disposed therein.

20. The furnace system according to paragraph 19, wherein the coils comprise radiant coils, convection coils, or a combination thereof.

21. A furnace system for cracking hydrocarbons, comprising: a radiant firebox comprising a plurality of burners, an injection nozzle, and one or more coils, wherein the coils comprise radiant coils, convection coils, or any combination thereof; a primary transfer line exchanger fluidly coupled to and downstream of the radiant firebox; a secondary transfer line exchanger fluidly coupled to and downstream of the primary transfer line exchanger; a first valve disposed between the primary transfer line exchanger and the secondary transfer line exchanger; a decoke effluent line fluidly coupled to and downstream of the primary transfer line exchanger and fluidly coupled to and upstream of the first valve; a second valve fluidly coupled to the decoke effluent line downstream of the primary transfer line exchanger; a flow restrictor fluidly coupled to the decoke effluent line downstream of the second valve; a decoke vessel fluidly coupled to the decoke effluent line and comprising an effluent inlet, a fluid outlet, and a coke outlet, wherein the effluent inlet is fluidly coupled to and downstream of the flow restrictor and the fluid outlet is fluidly coupled to and upstream of the injection nozzle of the radiant firebox, wherein the decoke vessel comprises a cyclone separator and is configured to: receive decoke effluent via the effluent inlet, separate the decoke effluent into coke particles and a decoke fluid, and transfer the coke particles to the coke collection bin via the coke outlet and the decoke fluid to the injection nozzle via the fluid outlet; and a coke collection bin coupled to the coke outlet of the decoke vessel, wherein the coke collection bin is configured to store the coke particles at ambient pressure.

22. A method of cracking hydrocarbons with the furnace system according to any one of paragraphs 1-21.

23. A method of cracking hydrocarbons, comprising: flowing a decoke effluent from a radiant firebox through a primary transfer line exchanger; flowing the decoke effluent from the primary transfer line exchanger through a flow restrictor; flowing the decoke effluent from the flow restrictor to a decoke vessel; separating the decoke effluent into coke particles and a decoke fluid within the decoke vessel; transferring the coke particles from the decoke vessel to a coke collection bin; transferring the decoke fluid from the decoke vessel to the radiant firebox; and combusting the decoke fluid within the radiant firebox.

24. The method according to paragraph 23, wherein the decoke vessel comprises a cyclone separator.

25. The method according to paragraph 23 or 24, further comprising transferring the coke particles to the coke collection bin at ambient pressure.

26. The method according to any one of paragraphs 23-25, further comprising storing the coke particles in the coke collection bin at ambient pressure.

27. The method according to any one of paragraphs 23-26, further comprising:
closing a valve disposed between the primary transfer line exchanger and the flow restrictor;
and flowing a production effluent from the primary transfer line exchanger to a secondary transfer line exchanger.

28. The method according to paragraph 27, further comprising flowing the production effluent from the secondary transfer line exchanger to a recovery system.

29. The method according to any one of paragraphs 23-28, prior to flowing the decoke effluent from the primary transfer line exchanger through the flow restrictor, the method further comprises: flowing a production effluent from the primary transfer line exchanger to a secondary transfer line exchanger; closing a first valve disposed between the primary transfer line exchanger and the secondary transfer line exchanger; opening a second valve disposed between the primary transfer line exchanger and the flow restrictor; and flowing the decoke effluent from the primary transfer line exchanger through the flow restrictor.

30. A furnace system for cracking hydrocarbons by the method according to any one of paragraphs 23-29.

Although the forms disclosed herein are described in terms of use within a furnace or an industrial furnace such as for the production of ethylene, it will be apparent to one of skill in the art that the teachings provided herein also have applicability to other process components and methods, such as, for example, thermal pyrolysis or cracking of other feeds, refining, boilers. Thus, the term furnace herein shall be understood to mean furnaces, boilers and other applicable apparatus, process components, and methods.

Overall, furnace systems and methods for cracking hydrocarbons, especially methods for steam cracking hydrocarbons to produce ethylene, provide enhanced energy efficiencies while successfully removing coke from the cracking processes.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

The invention claimed is:

1. A furnace system for cracking hydrocarbons, comprising:
a radiant firebox comprising a plurality of burners and an injection nozzle;
a primary transfer line exchanger fluidly coupled to and downstream of the radiant firebox;
a flow restrictor fluidly coupled to and downstream of the primary transfer line exchanger;
a decoke vessel comprising an effluent inlet, a fluid outlet, and a coke outlet, wherein the effluent inlet is fluidly coupled to and downstream of the flow restrictor and the fluid outlet is fluidly coupled to and upstream of the injection nozzle of the radiant firebox; and
at least one of (a) a moveable coke collection bin that is coupled to the coke outlet of the decoke vessel and (b) a fixed coke collection bin that is coupled to the coke outlet of the decoke vessel and is adapted to convey coke away from the furnace system.

2. The furnace system of claim 1, further comprising a valve disposed between the primary transfer line exchanger and the flow restrictor.

3. The furnace system of claim 1, further comprising a secondary transfer line exchanger fluidly coupled to and downstream of the primary transfer line exchanger and to the flow restrictor.

4. The furnace system of claim 3, further comprising a valve disposed between the primary transfer line exchanger and the secondary transfer line exchanger.

5. The furnace system of claim 3, wherein the secondary transfer line exchanger comprises an inlet and an outlet, wherein the inlet of the secondary transfer line exchanger is fluidly coupled to the outlet of the primary transfer line exchanger and the outlet of the secondary transfer line exchanger is fluidly coupled to a recovery system.

6. The furnace system of claim 1, wherein the decoke vessel comprises a cyclone separator.

7. The furnace system of claim 6, wherein the cyclone separator is configured to:
receive decoke effluent via the effluent inlet,
separate the decoke effluent into coke particles and a decoke fluid, and
transfer the coke particles to the coke collection bin via the coke outlet and the decoke fluid to the injection nozzle via the fluid outlet.

8. The furnace system of claim 7, wherein the coke collection bin is configured to store the coke particles at ambient pressure.

9. The furnace system of claim 1, wherein at least a portion of the plurality of burners is located on a bottom surface of the radiant firebox.

10. The furnace system of claim 1, wherein the injection nozzle is located adjacent to at least a portion of the plurality of burners.

11. The furnace system of claim 1, wherein the radiant firebox further comprises one or more coils disposed therein, wherein the coils comprise radiant coils, convection coils, or any combination thereof.

12. The furnace system of claim 1, wherein the flow restrictor comprises one or more flow restriction orifices configured to restrict flow.

13. A furnace system for cracking hydrocarbons, comprising:
a radiant firebox comprising a plurality of burners and an injection nozzle;
a primary transfer line exchanger fluidly coupled to and downstream of the radiant firebox;
a secondary transfer line exchanger fluidly coupled to and downstream of the primary transfer line exchanger;
a first valve disposed between the primary transfer line exchanger and the secondary transfer line exchanger;
a decoke effluent line fluidly coupled to and downstream of the primary transfer line exchanger and fluidly coupled to and upstream of the first valve;
a second valve fluidly coupled to the decoke effluent line downstream of the primary transfer line exchanger;
a flow restrictor fluidly coupled to the decoke effluent line downstream of the second valve;
a decoke vessel fluidly coupled to the decoke effluent line and comprising an effluent inlet, a fluid outlet, and a coke outlet, wherein the effluent inlet is fluidly coupled to and downstream of the flow restrictor and the fluid outlet is fluidly coupled to and upstream of the injection nozzle of the radiant firebox; and
at least one of (a) a moveable coke collection bin that is coupled to the coke outlet of the decoke vessel and (b)

a fixed coke collection bin that is coupled to the coke outlet of the decoke vessel and is adapted to convey coke away from the furnace system.

14. The furnace system of claim 13, wherein the decoke vessel comprises a cyclone separator.

15. The furnace system of claim 14, wherein the cyclone separator is configured to:
receive decoke effluent via the effluent inlet,
separate the decoke effluent into coke particles and a decoke fluid, and
transfer the coke particles to the coke collection bin via the coke outlet and the decoke fluid to the injection nozzle via the fluid outlet.

16. The furnace system of claim 14, wherein the coke collection bin is configured to store the coke particles at ambient pressure.

17. The furnace system of claim 13, wherein the radiant firebox further comprises one or more coils disposed therein, and wherein the coils comprise radiant coils, convection coils, or any combination thereof.

18. A furnace system for cracking hydrocarbons, comprising:
a radiant firebox comprising a plurality of burners, an injection nozzle, and one or more coils, wherein the coils comprise radiant coils, convection coils, or any combination thereof,
a primary transfer line exchanger fluidly coupled to and downstream of the radiant firebox;
a secondary transfer line exchanger fluidly coupled to and downstream of the primary transfer line exchanger;
a first valve disposed between the primary transfer line exchanger and the secondary transfer line exchanger;
a decoke effluent line fluidly coupled to and downstream of the primary transfer line exchanger and fluidly coupled to and upstream of the first valve;
a second valve fluidly coupled to the decoke effluent line downstream of the primary transfer line exchanger;
a flow restrictor fluidly coupled to the decoke effluent line downstream of the second valve;
a decoke vessel fluidly coupled to the decoke effluent line and comprising an effluent inlet, a fluid outlet, and a coke outlet, wherein the effluent inlet is fluidly coupled to and downstream of the flow restrictor and the fluid outlet is fluidly coupled to and upstream of the injection nozzle of the radiant firebox, wherein the decoke vessel comprises a cyclone separator and is configured to:
receive decoke effluent via the effluent inlet,
separate the decoke effluent into coke particles and a decoke fluid, and
transfer the decoke fluid to the injection nozzle via the fluid outlet; and
at least one of (a) a moveable coke collection bin that is coupled to the coke outlet of the decoke vessel and (b) a fixed coke collection bin that is coupled to the coke outlet of the decoke vessel and is adapted to convey coke away from the furnace system; wherein at least one of the moveable coke collection bin and fixed coke collection bin bine has an interior volume containing coke particles at ambient pressure.

19. A method of cracking hydrocarbons in a cracking furnace, comprising:
during decoking mode flowing a decoke effluent from a radiant firebox through a primary transfer line exchanger;
flowing the decoke effluent from the primary transfer line exchanger through a flow restrictor;
flowing the decoke effluent from the flow restrictor to a decoke vessel;
separating the decoke effluent into coke particles and a decoke fluid within the decoke vessel;
transferring the decoke fluid from the decoke vessel to the radiant firebox;
combusting the decoke fluid within the radiant firebox;
transferring the coke particles from the decoke vessel to a coke collection bin; and
transferring away from the cracking furnace at least a portion of the coke particles in the coke collection bin.

20. The method of claim 19, wherein the decoke vessel comprises a cyclone separator.

21. The method of claim 19, further comprising transferring the coke particles to the coke collection bin at ambient pressure, storing the coke particles in the coke collection bin at ambient pressure, or a combination thereof.

22. The method of claim 19, wherein the flow restrictor comprises one or more restriction orifice plates, one or more baffles, a conduit with a narrowed diameter, a plurality of flow restriction orifices, or a combination thereof.

23. The method of claim 19, further comprising:
closing a valve disposed between the primary transfer line exchanger and the flow restrictor; and
flowing a production effluent from the primary transfer line exchanger to a secondary transfer line exchanger.

24. The method of claim 23, further comprising flowing the production effluent from the secondary transfer line exchanger to a recovery system.

25. The method of claim 19, wherein prior to flowing the decoke effluent from the primary transfer line exchanger through the flow restrictor, the method further comprises:
flowing a production effluent from the primary transfer line exchanger to a secondary transfer line exchanger;
closing a first valve disposed between the primary transfer line exchanger and the secondary transfer line exchanger;
opening a second valve disposed between the primary transfer line exchanger and the flow restrictor; and
flowing the decoke effluent from the primary transfer line exchanger through the flow restrictor.

* * * * *